United States Patent [19]

Foster

[11] Patent Number: 5,052,885

[45] Date of Patent: Oct. 1, 1991

[54] DUAL OVERHEAD ENDOGGING SYSTEM APPARATUS AND METHOD

[75] Inventor: Theodore C. Foster, Bellingham, Wash.

[73] Assignee: Hawker Siddeley Canada, Inc., Ontario, Canada

[21] Appl. No.: 299,533

[22] Filed: Jan. 23, 1989

Related U.S. Application Data

[63] Continuation-in-part of Ser. No. 161,278, Feb. 22, 1988, abandoned, which is a continuation of Ser. No. 713,500, Mar. 19, 1985, abandoned.

[51] Int. Cl.[5] .............................................. B65G 47/90

[52] U.S. Cl. ................................. 414/746.8; 414/753; 198/468.2; 83/435.1

[58] Field of Search ....................... 83/435.1, 417, 707; 414/745, 751, 753, 746.8; 198/570, 468.1, 448, 468.2

[56] References Cited

U.S. PATENT DOCUMENTS 4,422,487 12/1983 McCurdy ........................ 144/245 R

FOREIGN PATENT DOCUMENTS 301868 11/1968 Sweden .

*Primary Examiner*—D. Glenn Dayoan
*Attorney, Agent, or Firm*—Oliff & Berridge

[57] ABSTRACT

An endogging apparatus uses twin reciprocally moving carriage pair, each pair having respective axially spaced dogs. One of the carriage pairs grasps the log from a log charger by applying axial faces to end faces of the logs with its dogs and transports the log to and through breakdown elements. The second carriage pair moves from the location of the breakdown elements to the charger to grasp a second log with its dog. The dogs on the carriage pairs are offset and retractable to allow passage of the carriage pairs when one carriage pair is transporting a log through the breakdown elements with extended dogs and the second carriage pair is returning unloaded to the charger with retracted dogs. The carriage pairs are mounted on rails with bearing assemblies which cooperate with the rails to resist twisting faces on the carriages generated as a reaction to axial faces applied by the logs.

19 Claims, 9 Drawing Sheets

DUAL OVERHEAD ENDOGGING SYSTEM APPARATUS AND METHOD

CROSS REFERENCE TO RELATED APPLICATIONS

This application is a Continuation-in-part of U.S. application Ser. No. 161,278, filed Feb. 22, 1988, now abandoned, which is a continuation of U.S. application Ser. No. 713,500, filed Mar. 19, 1985, now abandoned.

BACKGROUND OF THE INVENTION

This application relates to an endogging log transport apparatus and, more particularly, to an endogging apparatus with dual carriages for transporting logs from a log charger and through log breakdown elements.

Endogging carriages are used in lumber mills to transport unprocessed logs from a log charger through the breakdown elements such as chippers, bandsaws, circle saws and the like. The carriage has dogs mounted thereon which grasp the log, remove it from the log charger and transport it lengthwise through the log breakdown elements where the log is processed. The carriage then returns unloaded from the breakdown elements to the log charger where it retrieves another log and repeats the process.

The process is inefficient. While the log charger has the capability of supplying a steady stream of logs to the carriages with little delay therebetween, there is a lengthy time delay between successive log grasping steps while the carriage moves the first log from the charger through the log breakdown elements and returns. While the speed of the process may be increased by providing well functioning machinery, it is inherently limited by the process. While it has been possible to provide a second carriage, such a carriage could only be used with an additional charger and additional breakdown equipment which, again, is inefficient for precisely the same reasons as explained.

Yet another disadvantage in present log transport apparatus is the arrangement used to prevent the carriages transporting logs from leaving the rails on which they move. The loads applied to the carriages when grasping, transporting and releasing logs are unpredictable, include impacting and acting in a variety of directions on the carriages which tend under some conditions to remove the carriage, usually upwardly, from the rails. To obviate this possibility, a "hold down" wheel has been used in some prior apparatus which acts vertically downwardly on the carriages and thus prevents the carriages from moving upwardly off the rails. This requires additional equipment and increases costs.

U.S. Pat. No. 3,756,296 issued to Bo Ackerfeldt, discloses a log processing apparatus having a pair of carriages running on laterally spaced apart main rails which are disposed on opposite sides of a feed axis of log processing or breakdown equipment. Each carriage has a pair of downwardly extending log holding arms or dogs which are off-set inwardly from the carriage towards the feed axis so that gripping means of the dogs are on the feed axis. The dogs of one carriage are extended to a lowered position for gripping a log for feeding the logs forwardly through the apparatus, while concurrently the second carriage, with retracted dogs, moves in a reverse direction, passing the first carriage without interference therewith due to retracted dogs. The first carriage releases the log and the second carriage engages a second log and feeds it forwardly, while the first carriage is returning with retracted dogs to pick up a third log. While this apparatus discloses a pair of carriages which reciprocate in opposite directions to improve throughout of logs through the apparatus, each dog grips the log with top and bottom clamps which has disadvantages as follows.

The top clamp of each dog requires a vertical movement which is separate and distinct from the horizontal movements necessary to adjust the spacing between the dogs to accommodate logs of different lengths. This introduces additional adjustments, which necessarily slows down the grasping of the log prior to transportation to the log breakdown apparatus. Guide rails spaced vertically below the main rail guide the carriage and lower ends of the dogs. The provision of a lower dog guide rail and bottom jaws of the clamping apparatus of this patent obstructs the lower surface of the log. This obstruction prevents machining of the lower surface of the log while it is gripped by the top and bottom clamps which limits versatility and requires additional machinery stations downstream from the apparatus.

SUMMARY OF THE INVENTION

The invention reduces difficulties and disadvantages of the prior art by providing an endogging system in which time required for engaging transverse end faces of a log, and for feeding the log through log breakdown elements is reduced, thus permitting a higher throughput of logs through the apparatus. This is attained by simplifying the steps of adjusting the apparatus to logs of different lengths and clamping end portions of the logs between appropriately spaced dogs. Lower portions of the dogs do not require guides nor do they project beyond lower surfaces of the log, thus leaving the lower surface of the log free of obstructions. Furthermore, accuracy of positioning the log on the charger is maintained when grasping the log, so as to ensure that logs fed through the breakdown elements are positioned in a known attitude thus permitting high recovery of material from the log.

According to one aspect of the invention, there is disclosed an endogging system comprising first and second carriage means mounted for reciprocal movement along first and second carriage support axes respectively spaced laterally from, and on opposite sides of a vertical plane. Each of said carriage means is operable to transport a log from a first location located substantially on said vertical plane to a second location and to return to said first location without said log.

Each of said carriage means has twin carriages, each of said carriages including dog means extending downwardly therefrom to apply an axial force to engage transversely disposed end faces of the log. Each of said dog means has a transition area between said dog means and said respective carriage, said transition area being offset from said vertical plane whereby said first and second carriage means may pass each other when said dog means of said first carriage means are in said transport mode, and said dog means of said second carriage means are in said retracted mode. The dog means are substantially on said vertical plane in both said transport and said retracted modes. Each of the carriage means have means for resisting forces on the carriage means generated as a reaction to said axial force applied by said dog means.

According to a further aspect of the invention, a method of transporting logs along a log feed axis from a first to a second location on the feed axis comprises the following steps:

mounting first and second carriage means for reciprocal movement along first and second carriage support axes respectively, the carriage support axes being spaced laterally apart from, and on opposite sides of, the log feed axis;

engaging transversely disposed end faces at opposite ends of a first log with dog means of the first carriage means in said first location and applying an axial force thereto to grasp the log, and moving said log by said dog means to said second location while concurrently resisting twisting forces generated on the first carriage means as a reaction to the said axial force applied to the log and the said lateral spacing between the log feed axis and the carriage support axis;

concurrently moving the second carriage means with respective dog means thereof retracted from said second location to said first location;

releasing said first log at said second location and retracting the dogs of said first carriage means;

extending the dogs of the second carriage means and engaging transversely disposed end faces at opposite ends of a second log with said dog means at said first location, and applying an axial force thereto to grasp the second log, and moving said second log by said dog means to said second location while concurrently resisting twisting forces generated on the second carriage means as a reaction to the axial force applied to the second log and the lateral spacing between the log feed axis and the second carriage support axis;

concurrently moving said first carriage means, with the respective dog means thereof retracted from said second location to said first location.

According to yet a further aspect of the invention there is disclosed a bearing arrangement for a log transport carriage means comprising a first and second rail means, a carriage means reciprocal on said first and second rail means, first and second bearing means between said first and second rail means and said carriage means, each of said bearing means being positioned about and in contact with each of said rail means and being operable to transfer variable loading on said carriage means to said rail means.

According to a further aspect of the invention there is disclosed an endogging system comprising log charger means, reciprocal first and second carriage means, each of said carriage means being operable to longitudinally transport a log from said log charger means to a second location along a first and second vertical plane, respectively, dog means mounted on each of said carriage means having an extended log transport and a retracted mode, said charger means being alternately moveable between said first and second vertical planes to cooperate with the reciprocal movement of said carriage means.

According to yet a further aspect of the invention, there is disclosed a log processing method comprising the steps of providing a first log at a first infeed location with a log charger means, grasping said log at said first infeed location with a first set of dogs extending from a first carriage means, transporting said log with said first carriage means through a log processing station, releasing said log at a first outfeed location after passage through said log processing station and returning said first carriage means to said first infeed location, providing a second log at a second infeed location with said log charger means, grasping said second log at said second infeed location with a second set of dogs extending from a second carriage means, transporting said second log through said log processing station, releasing said second log at a second outfeed location and returning said second carriage means to said second infeed location, said charger alternately providing said first and second logs at said first and second infeed locations, said first and second carriage means having reciprocating and oppositely opposed movement between said respective first and second infeed locations and said respective first and second outfeed locations and said log processing station.

According to yet a further aspect of the invention, there is disclosed an endogging system comprising log charger means, reciprocal first and second carriage means, each of said carriage means being operable to longitudinally transport a log from said log charger means to a second location along a first and second vertical plane, respectively, dog means mounted on each of said carriage means and being operable to carry and transport logs, and log processing means moveable between said first and second planes to receive a log transported by said first and second carriage means respectively.

According to yet a further aspect of the invention, there is disclosed a log transport method comprising the steps of providing a first log at a first location, grasping said first log at said first location with a first set of dogs extending from a first carriage means, transporting said log with said first carriage means through a log processing station substantially on a first vertical plane, releasing said log after passage through said log processing station and returning said first carriage means to said first location, providing a second log at a second location, grasping said second log with a second set of dogs extending from a second carriage means, transporting said log through said log processing station substantially on a second vertical plane, releasing said log after passage through said log processing station and returning said second carriage means to said second location, said log processing station being alternately moveable between said first and second vertical planes to receive said logs from said first and second carriage means, respectively.

BRIEF DESCRIPTION OF THE DRAWINGS

A specific embodiment of the invention will now be described, by way of example only, with the use of drawings in which.

DETAILED DISCLOSURE

FIGS. 1A, 1B, 2A, 2B, 2C and 3

Figures 1A, 1B:
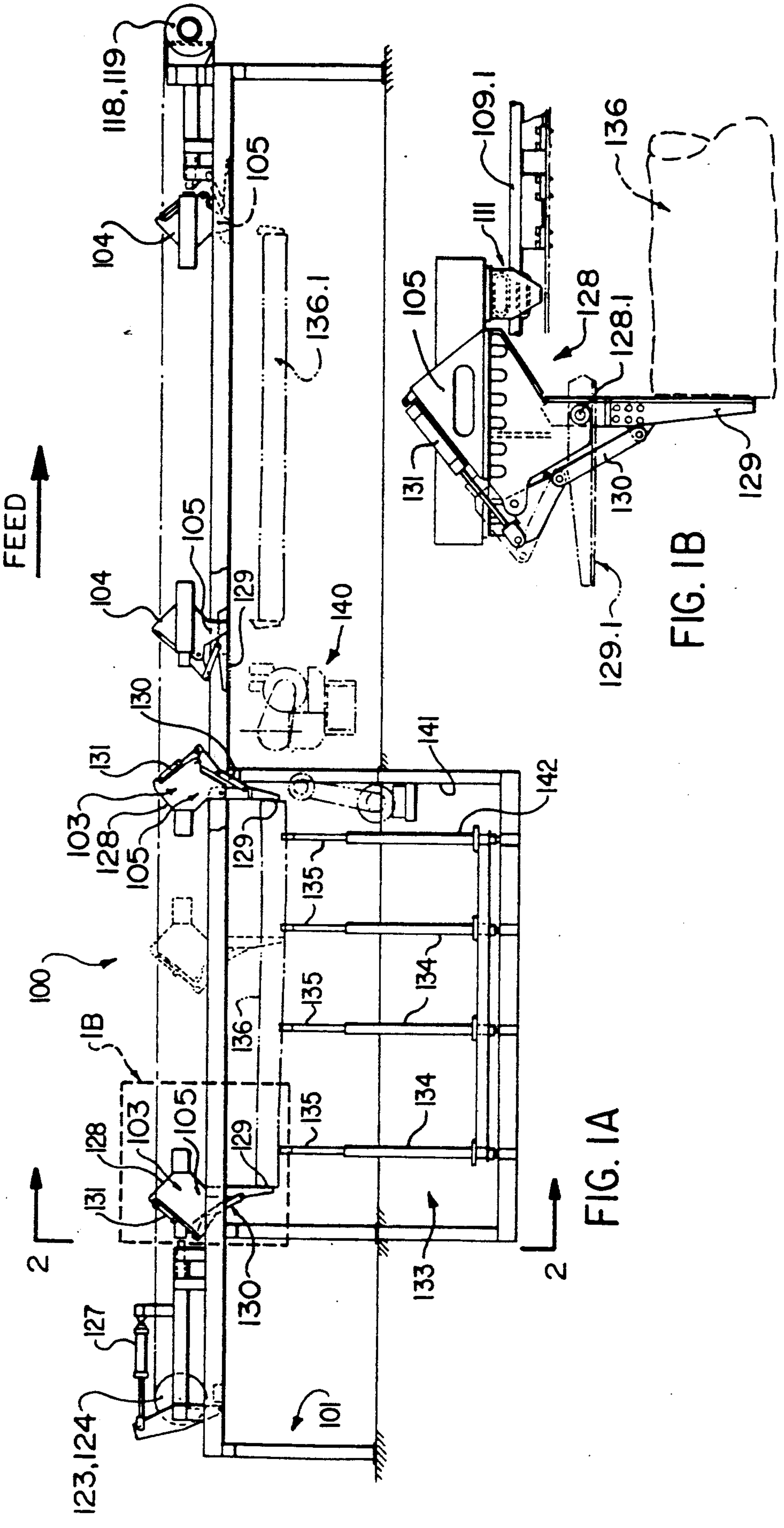
FIG. 1A is an elevation view of a first embodiment of a dual overhead endogging system according to the invention.
FIG. 1B is an enlarged partial elevation view of the area 1B shown in broken outline in FIG. 1A showing one carriage.
Figure 3:
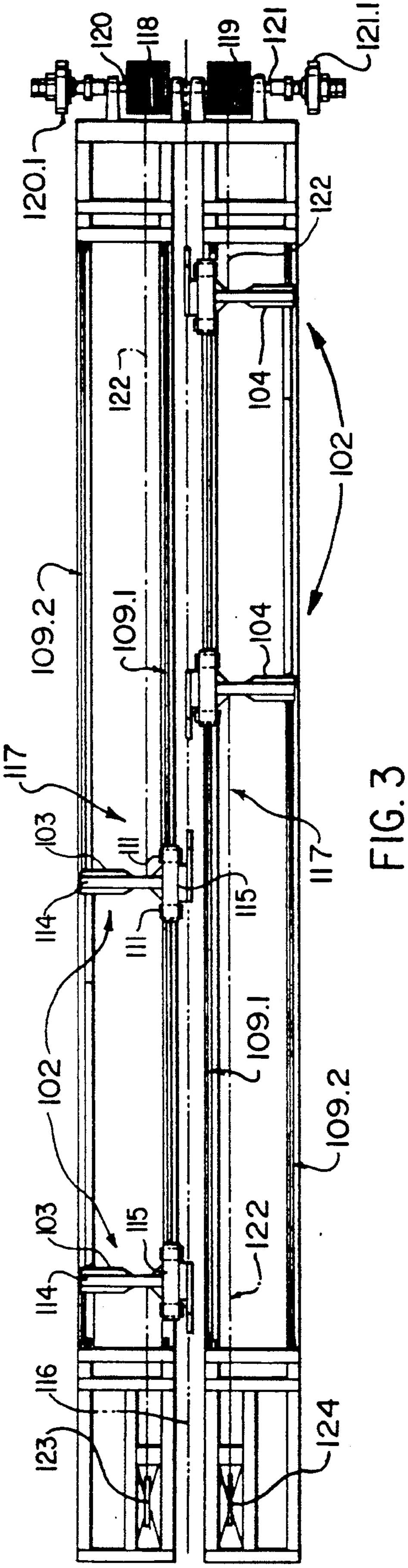
FIG. 3 is a plan view of the apparatus illustrated in FIG. 1A.

Referring now to the drawings, a dual overhead endogging system is shown generally at 100 in FIG. 1A, and comprises a support frame generally shown at 101 mounting dual carriage means generally designated 102 (FIG. 3). The dual carriage means comprises carriage pairs 103 and 104, and four husk and dog means generally shown at 105; each husk and dog means 105 being connected to a respective one of the carriages 103, 104.

Figure 2A:
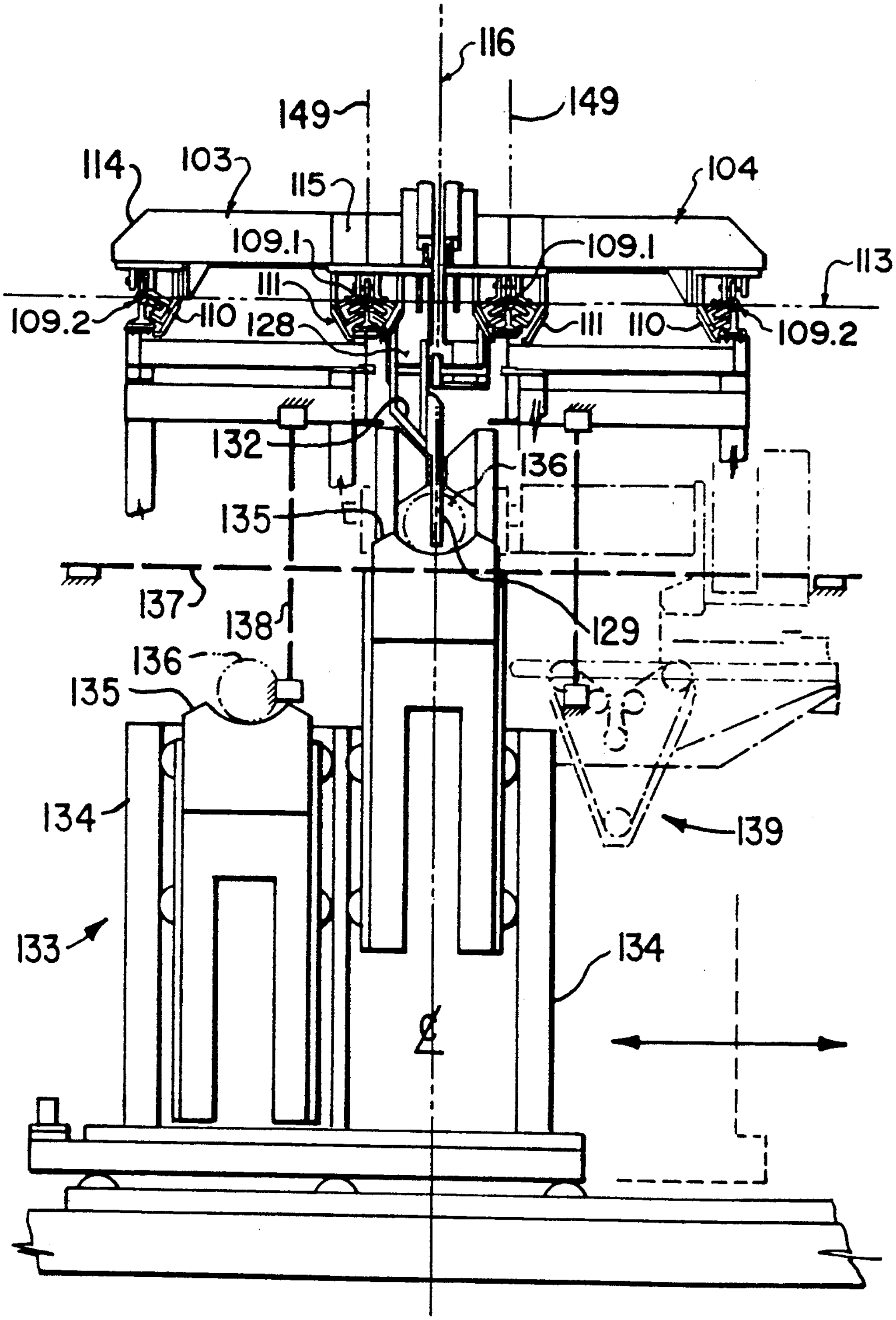
FIG. 2A is a section view taken along 2—2 of FIG. 1A.
Figure 2B:
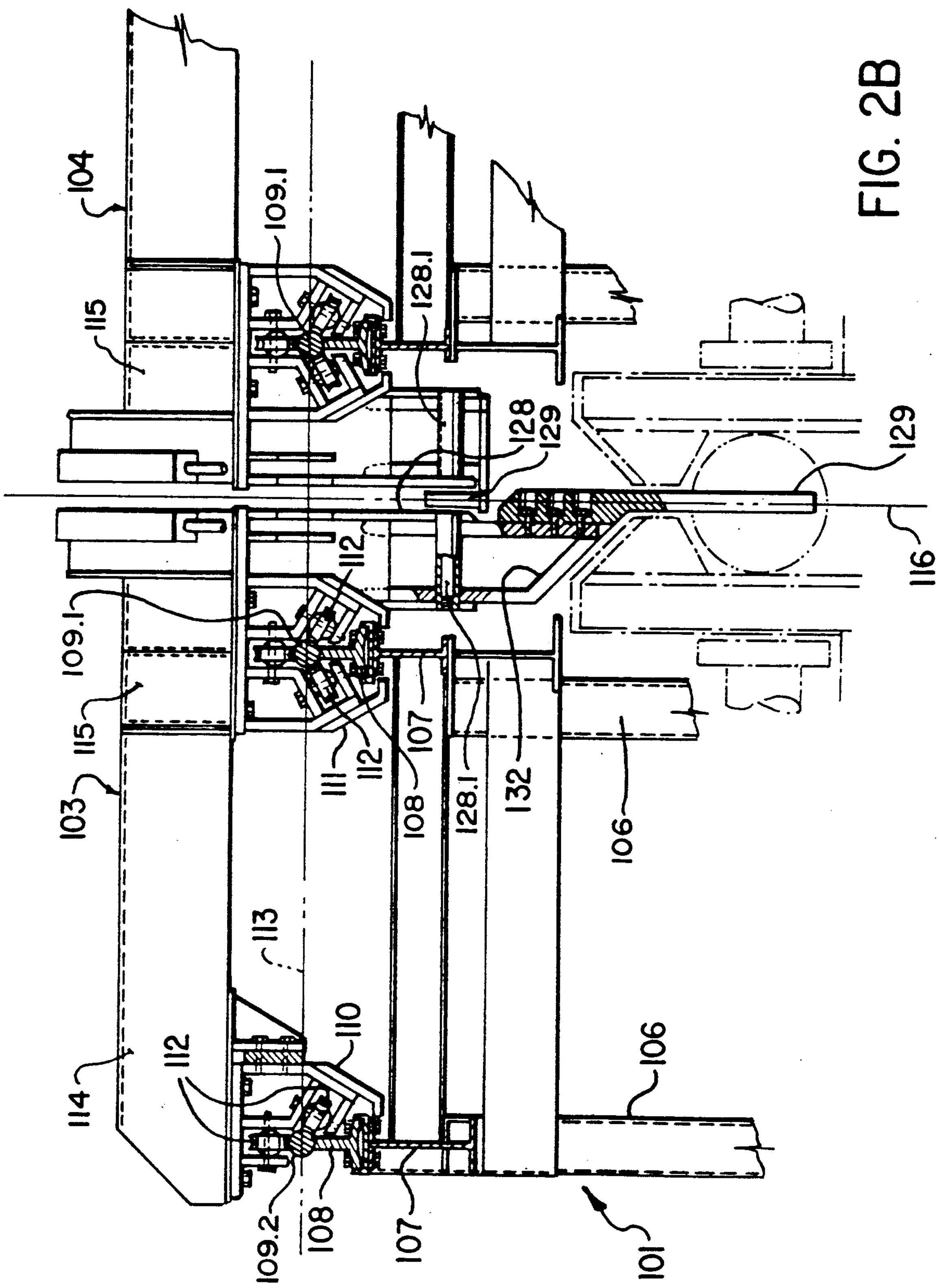
FIG. 2B is an enlarged partial sectional view of the carriage, bearing system and extended dogs of FIG. 2A.

As seen in FIG. 2B, the support frame 101 comprises a series of box members 106 which support "I" sectional members 107 which are mounted on the box members 106 and which extend the length of the endogging system 100 to form longitudinal frame members. Inverted "T" sectional members 108 are mounted on the I sectional members 107. Inner and outer round shafting or rails 109.1 and 109.2 are mounted on the top of each "T" sectional member 108 and the shafting substantially extends the length of the "T" sectional members 108. The terms "outer" and "inner" are each used with respect to a vertical plane 116 which bisects the endogging system 100 as seen in FIG. 3 and contains a log feed axis. "Inwardly" is directed towards the vertical plane 116 and "outwardly" is directed away from the vertical plane 116.

Each of the carriages 103, 104 is mounted on respective outer and inner round shafting 109.2 and 109.1 by using outer and inner bearing housings 110 and 111, respectively connected thereto, each housing 110, 111 containing a plurality of bearing assemblies termed roundway bearings 112 (FIG. 2B). The roundway bearings are known commercial items, a typical type being sold by Thomson Industries Incorporated, a company of the State of New York, U.S.A. Each roundway bearing comprises an endless loop of roller chain having an inner run of rollers held in contact with the rail, and an outer run spaced radially outwardly therefrom, the runs of rollers being interconnected to form a loop enclosing a short round shaft. The roundway bearings are adapted to withstand high inwardly directed radial forces, but cannot withstand any substantial tangentially directed forces. Consequently, the roundway bearings are disposed relative to the rail to restrict anticipated forces as will be described.

One outer bearing housing 110 is provided on each of the carriages 103, 104 and contains two roundway bearings 112 mounted approximately 120 degrees apart with one of the bearings 112 being located directly above the round shafting 109.2 as depicted, and the other located below a horizontal plane 113 passing through the rails 109.1 and 109.2. Each of the inner bearing housings 111, two of which are used on each carriage, contains three roundway bearings 112 spaced substantially equidistantly around the shafting 109.2, one bearing 112 being located directly above the shafting 109.2. The bearing housing 110 is mounted on an outer arm 114 of carriages 103, 104 as viewed in FIGS. 2A and 3, and the bearing housings 111 are mounted on an inner arm 115 of carriages 103, 104, one housing 111 being located at each end of each carriage 103, 104.

It can be seen that the first and second carriage means are mounted for reciprocal movement along first and second carriage support axes respectively, which, for convenience, are assumed to be inner rails 109.1 of each pair of rails 109.1 and 109.2. Thus the carriage support axis of each carriage means is spaced laterally apart from, and on opposite sides of, the log feed axis 116 which provides an off-set or lateral spacing to provide lateral clearance between the two carriage means. This lateral clearance is required to permit reciprocation between the carriage means without interference, but generates twisting forces on the carriages as will be described, which forces are resisted by the bearing housings engaging the rails as follows.

The inner rail 109.1 is engaged by three roundway bearings in the inner housing 111, and thus can resist forces applied to the carriage in any direction disposed radially of the rail. This is necessary as the forces imposed on the carriage from both gripping the log and resisting cutting forces on the log can be relatively high and complex and have components in both horizontal and vertical planes. In contrast, the two roundway bearings in the outer bearing housing 110 are adapted to resist components of force mainly in a vertical plane, and some lessor components of force in a horizontal plane. Spacing between the rails 109.1 and 109.2 is relatively critical as the roundway bearings are close tolerance bearings and provide little accommodation to variations in inter-rail spacing.

The precise position of the roundway bearings 112 about the horizontally spaced shafting 109.1 and 109.2 can be determined according to the loading on the carriages 103, 104. Bearings should be positioned both above and below the horizontal plane 113 (FIG. 2A) and at least one bearing housing 111 should have bearings 112 on both sides of the vertical plane 149 passing through the shafting 109.1.

Figure 2C:
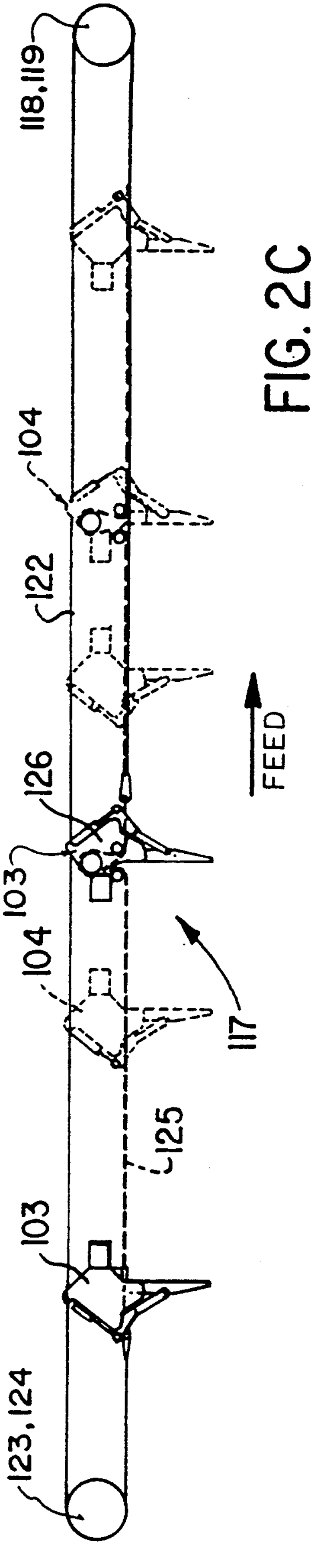
FIG. 2C is a simplified partial view of one carriage pair particularly illustrating the cable and chain spacing adjustment method.

As seen in FIGS. 2C and 3, each pair of carriages 103 and 104 is connected by a combination chain and cable drive system generally shown at 117 for moving the carriages along the rails. The system 117 has two main carriage drive pulleys 118 and 119 adjacent an outfeed end thereof, each drive pulley being mounted independently on separate drive shafts 120 and 121, which are powered by respective hydraulic or electric motors 120.1 and 121.1. A pair of similar free-wheeling idler pulleys 123 and 124 are provided at an infeed end. A cable 122 is wrapped around the drive pulley 118 and the corresponding idler pulley 123, and a similar cable 122 is wrapped around the drive pulley 119 and the corresponding idler pulley 124. For convenience of description, the carriage on the left hand end of the pair of carriages 103 is termed the first carriage, and the carriage on the right hand end of the carriage pair is termed a second carriage. One end of one cable 122 is attached to the first carriage 103 and passes around the idler pulley 123 and the drive pulley 118 and is connected to a right hand end of a length of chain 125, shown in broken outline in FIG. 2C. A left hand end of the chain 125 is connected to the first carriage 103, so that the cable 122 and chain 125 form a continuous loop, with the first carriage interconnecting adjacent ends of the cable and chain. The second carriage of the carriage pair 103 includes a hydraulically or electrically powered chain wrap and pulley system 126, which engages a length of the chain 125 adjacent the right hand end thereof. The carriages 104 are generally similar to the carriages 103 and are connected together by respective lengths of cable 122 and chain 125 as described. Thus, one of each pair of carriages 103, 104 is connected directly to a respective chain 125 and the other of each pair of carriages containing the chain wrapping pulley system 126 cooperates with the chain. By activating the pulley system 126, distance between each pair of carriages 103, 104 may be lengthened or shortened as required to accommodate different lengths of logs being transported. A hydraulic cylinder 127 (FIG. 1A) is connected to each of the idler pulleys 123 and 124 for adjusting tension in the chain wrap and pulley system 126.

Referring tq FIGS. 1A and 1B, the husk and dog means 105 include husks 128 mounted on the carriages 103, 104 and retractable dogs 129 are pivotably connected to the husks 128. The term "husk" refers to most of the structure of the carriage, and provides a heavy duty journal assembly for each dog of each carriage which is strengthened to resist the high forces imposed thereon as a result of gripping and processing the log as will be described. As seen in FIG. 1B, each dog 129 is hinged to the respective husk 128 by a husk pivot 128.1 to permit the dog 129 to swing between the extended position or log transport mode shown in full outline, to the retracted position or mode 129.1 shown in broken outline. An actuating linkage 130 extends between the husk 128 and the retractable dog 129 to rotate the dog between the two positions, each actuating linkage 130 being operated by a hydraulic cylinder 131.

As best seen in FIGS. 2A and 2B, the dogs 129 are offset from the husks 128; that is, each dog 129 extends downwardly from the respective husk 128 and then inwardly by way of a transition area 132 towards the vertical plane 116 of the endogging system 100 so that the gripping portion of each dog 129 is centered on the vertical plane 116. The transition area 132 of each of the dogs 129 extends inwardly at a distance sufficiently below the respective husk 128 so that the husks 128 of the carriages 103, 104 may freely pass as the carriages reciprocate during movement on the round shafting or rails, with one of the pair of carriages 103, 104 having its dogs 129 in the retracted position when the other of the pair of carriages 103, 104 having its dogs 129 in the extended position as seen in FIG. 1A.

To permit a lower surface of the log to be machined when gripped by the dogs, it must be clear of obstructions. Thus, lower end portions of the dogs do not require guide rails or any other restraining means. Furthermore, the dogs do not project downwardly beyond the lowermost surface of the log, in contrast with some prior art log handling equipment. Thus, the dog extends as a cantilever from the husk 128, and thus is stiffened and journalled to essentially eliminate any material deflection of the lower end of the dog out of the vertical plane 116. Because the lower surface is clear of obstructions, both side surfaces and the lower surface of the log can be machined at one log processing station, thus eliminating the need for a second log processing station for this particular operation and thus reducing installation costs and processing time.

With reference to FIGS. 1A and 2A, a log charger is generally shown at 133 and is positioned below and alongside the carriages 103, 104 and support frame 101. It includes a plurality of yoke guides 134 which are moveable horizontally in the direction indicated by an undesignated double-handed arrow in FIG. 2A together with the yokes 135 which move vertically with respect to the yoke guides 134 to position a log 136 for pickup by the respective dogs 129 of the carriages 103, 104. Horizontal and vertical banks of photocells and oppositely facing respective light sources form horizontal and vertical scanner lines 137, 138, respectively, in the log charger 133 and a series of even ending rollers (not shown) are positioned between the yoke guides 134. A right hand yoke 135 is shown in a raised or pick-up position to support a first log 136 for gripping by the dogs 129. A left hand yoke 135 is shown in a lowered position supporting a second log 136, prior to moving to the pick-up position.

The log charger 133, although being described as useful for charging logs and/or cants from both sides of the charger 133 to the dogs 129 for loading in the carriage embodiment described, could, if desired, supply logs or cants from one side only.

Only one log turner and stop and loader system 139 is shown in FIG. 2A but one such system is located on each side of the charger 133. Known breakdown and log processing elements 140 (FIG. 1A) such as chippers, bandsaws, circular saws and the like are located adjacent the log charger 133. For convenience of description, the log charger is defined as locating the log 136 at a first or infeed location on the plane 116 i.e., adjacent the infeed and or left hand end of FIG. 1A. The log is transported to a second or outfeed location on the plane 116, which for convenience is designated 136.1, and is disposed adjacent the outfeed or right hand end of the FIG. 1A. It can be seen that the log breakdown and processing elements 140 are located between the first and second locations of the log.

OPERATION

In operation, logs enter the log charger 133 from one or both sides although a log 136 is shown on one side only in FIG. 2A. The incoming log 136 is stopped and positioned and even ending rolls (not shown) rotate and drive the log 136 against "zero line" 141 (FIG. 1A) of the support frame 101. The log turner will subsequently be rotated until a "horns up" log position is preferably reached, all of these operations being performed by the log turner and stop and loader system 139. The yoke guides 134 of the log charger 133 will move beneath the log 136 and the appropriate yokes 135, depending on log length, will move vertically relative to the yoke guides 134, and raise the log 136. As the log 136 is raised, it passes through horizontal scanner line 137 which defines the vertical log configuration for the processing elements. The yoke guides 134 will move horizontally towards the vertical plane 116 until the log 136 is in the pick-up position. While the log moves towards the pick-up position, the vertical scanner line 138 is passed which gives the horizontal log definition for the processing elements. The skew yoke guide 142 (FIG. 1A) will move the log 136 in a plane transverse to the vertical plane 116 and the yokes 135 will raise the log 136 vertically until the optimum log processing position is reached. The log 136 is then ready for pickup at the first or infeed location thereof as seen in FIG. 2A.

When the optimum log processing position is reached by the log charger 133, the skew yoke guide 142 and the yokes 135, sensing devices (not shown) instruct the system control (not shown) to drop the dogs 129 by energizing hydraulic cylinders 131 (FIGS. 1A and 1B). The leftwardly located husk 128 will be moved under the influence of the chain wrap and pulley system 126 to the proper log length whereupon the dogs 129 will contact transversely disposed end faces of the log 136 at both ends with the appropriate retaining axial force. Similarly to other endogging systems, the dogs swing downwardly about the respective husk to a fully-extended, over-centered position, prior to contact with the end faces of the log. The chain wrap and pulley system 126 is then adjusted to provide adequate axial load on opposite end faces of the log to ensure the log is securely gripped between the dogs thus essentially preventing loss of optimum log processing position as set by the log charger and yokes. When a detector switch (not shown) is triggered, the yokes 135 will move downwardly and out of contact with log 136 gripped by the dogs.

As stated previously, the log feed axis, which is within the plane 116, is spaced laterally from the carriage support axis, which for convenience is assumed to be the inner rail 109.1. The off-set transition area 132 of the dog permits the dog to extend laterally from the carriage to engage the end face which is necessarily displaced laterally from the carriage. This off-set or lateral spacing between the planes generates a twisting force on each of the carriages, as a reaction to the axial force applied to the log by the dogs. This twisting force on each carriage is reacted by the roundway bearing housings 110 and 111 which embrace the rails in such a way as to prevent the carriages from leaving the rails as a result of the twisting forces. It can be seen that the particular arrangement of rails and spaced apart bearings serve as means for resisting twisting forces on the carriage means generated as a reaction to said axial forces on said dog means. The carriages 103 will commence rightward movement as viewed in FIG. 3 while grasping the log 136 by energizing main carriage drive pulley 118.

As the carriages 103 move rightwardly with the log through the breakdown elements 140, the loading caused by the passage of the log 136 through the breakdown elements is transferred to the dogs 129, the husks 128, and, thence, to the carriages 103. The carriage loading, which is in addition to the loading due to axial gripping force, also has a tendency to lift the carriages 103 off the rails 109.1 and 109.2, but since the roundway bearing 112 in the bearing housings 110 contact the rails 109 substantially around their periphery, all loading is transferred to the rails 109.1 and 109.2 and thence to the support frame 101 or ground, on which the rails are supported. Thus, the carriages 103 remain on the rails throughout their reciprocal movement.

Carriages 104 meanwhile are moving leftwardly with the dogs 129 in their retracted position as shown in FIG. 1A. As log 136 enters and clears the initial log processing and breakdown elements 140, the dogs 129 are retracted by a position transducer (not shown) which energizes hydraulic cylinders 131 and moves actuating linkage 130. The log 136 is released at the second or outfeed location and continues to travel under the influence of rollers (not shown) to further processing stations downstream.

As the log 136 enters the log processing station 140, the carriages 103, 104 will pass each other on opposite sides of vertical plane 116. As the carriages reciprocate, the dogs 129 of the returning carriages 104 are in the retracted position.

Meanwhile, when the carriages 104 reach their leftwardmost pickup position, with reference to FIG. 3, the dogs 128 have been extended to grasp the next log 136 which is in a raised and optimum position at the first location on the yokes 135 and which is substantially on the vertical center plane 116. This log 136, however, will have been provided to the log charger 133 from the rightward position as viewed in FIG. 2A. The dogs 129 of carriages 104 will then grasp the log 136 and move it longitudinally from the pickup location, through the log processing elements 140 to the second or outfeed location as earlier described. While the carriages 104 transport log 136 to the processing elements 140, carriages 103 are returning to the log pickup or first location with their dogs 129 retracted. Again with reference to FIGS. 1A and 2A, the carriages 103, 104 pass as explained on opposite sides of the vertical center plane 116 and the system repeats its functioning as earlier described.

ALTERNATIVES

FIG. 2D

Figure 2D:
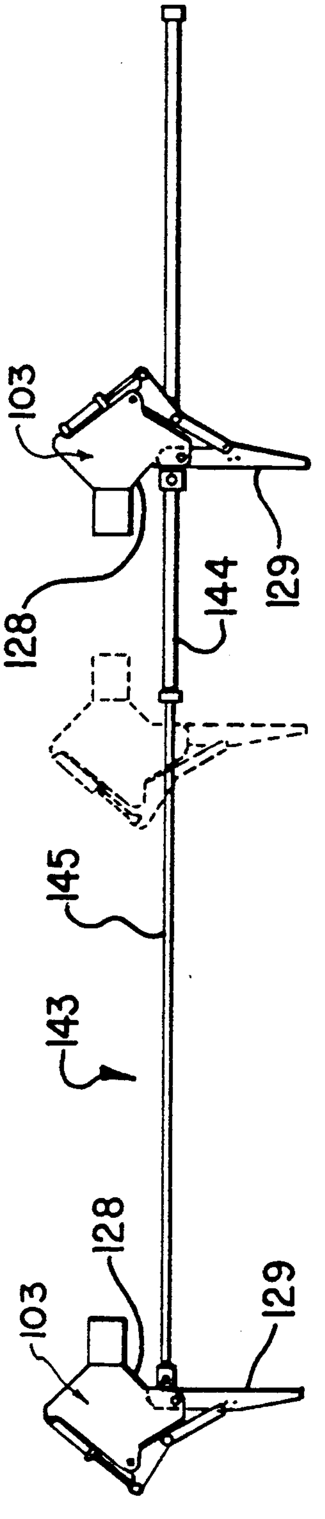
FIG. 2D is a simplified partial view of one carriage pair particularly illustrating an alternative hydraulic cylinder spacing adjustment method.

Many modifications are contemplated in the system just described. For example, the chain wrap and pulley system 126 illustrated in FIG. 2C could be replaced by an alternative hydraulic cylinder log clamping arrangement 143 illustrated in FIG. 2D. In this arrangement, a hydraulic clamping cylinder body 144 is connected directly to one of the husks 128 and its respective piston rod 145 is connected to an oppositely located husk 128 as depicted. The correct length adjustment between extended dogs 129 of the carriages is obtained by extending and retracting the piston rod 145 from hydraulic cylinder 144. This configuration is particularly applicable to shorter logs such as stud logs and bears some resemblance to alternative structures to be described with reference to FIGS. 6 through 9.

Figure 4:
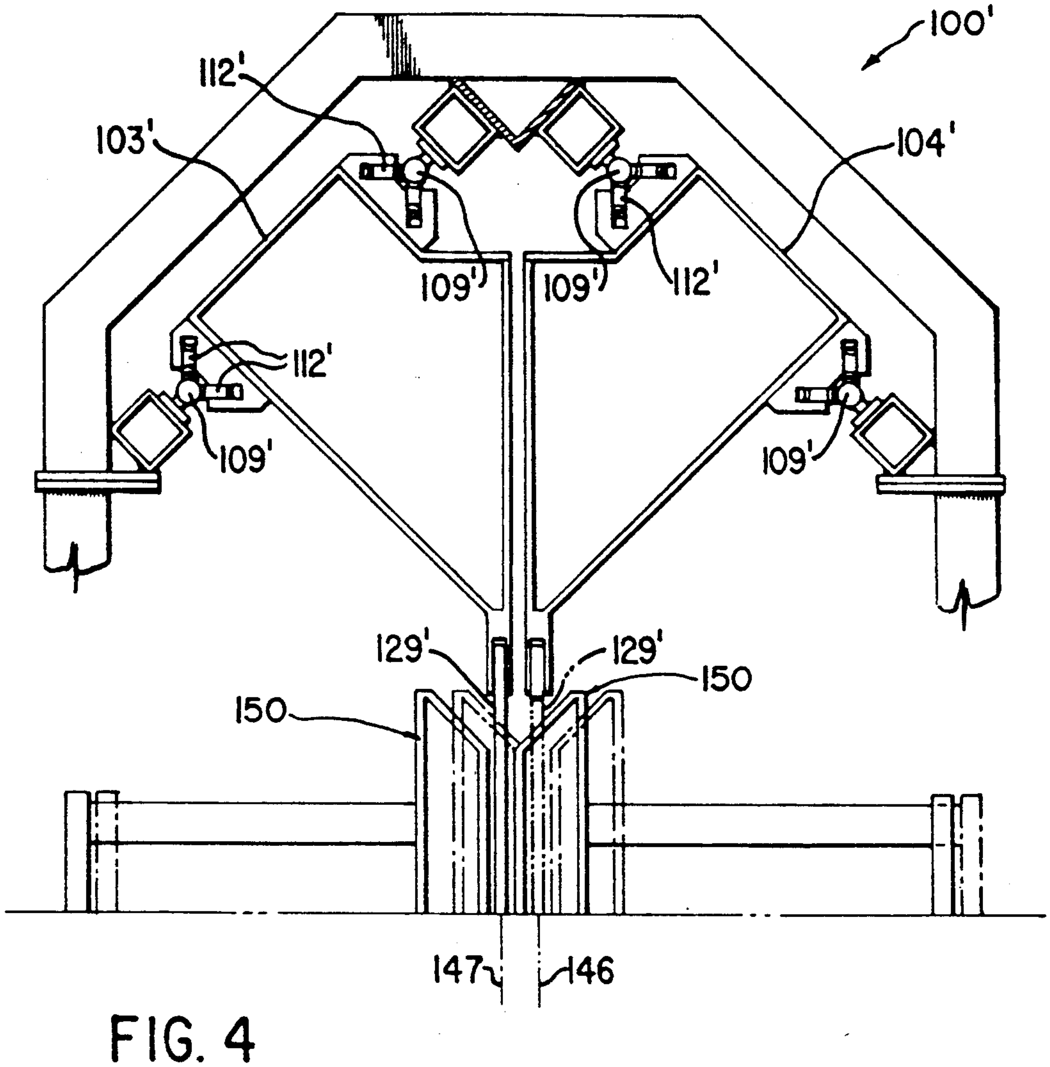
FIG. 4 is a transverse sectional view depicting a second embodiment of the endogging system.
Figure 5:
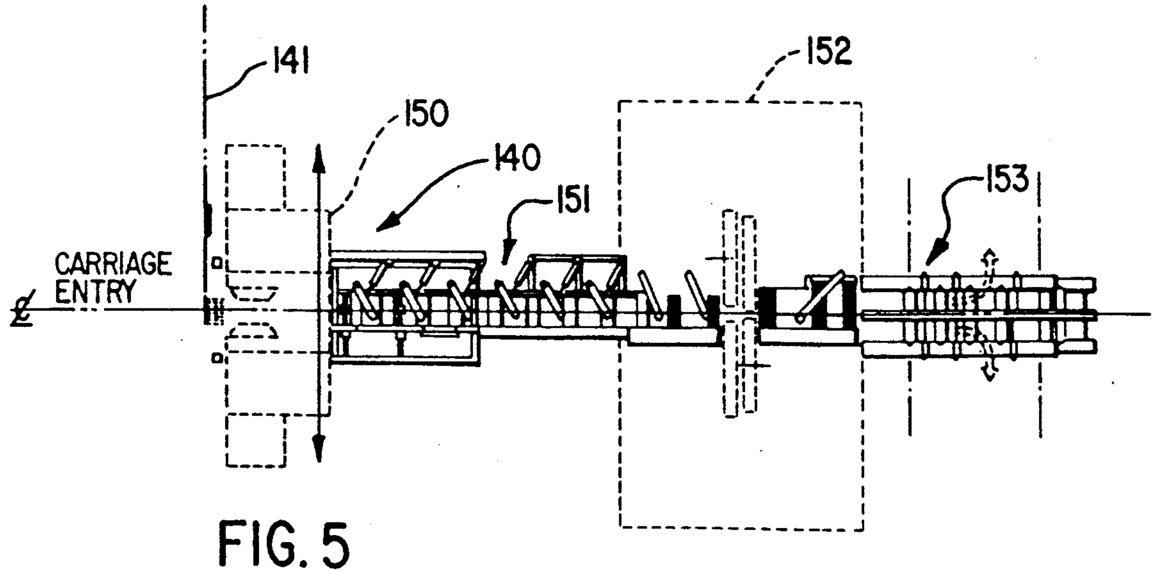
FIG. 5 is a plan view of log processing and breakdown elements located adjacent to and on the same centre line as the dual carriage system of FIG. 1A.

FIGS. 4 and 5

A further alternative embodiment of the dual endogging system 100 is designated 100' in FIG. 4 in which elements which correspond to similar elements disclosed in the previous figures are designated with a prime (e.g. 103'). In this embodiment, the dual carriages 103', 104' each reciprocate on round shafting or rails 109' but rather than have the two sets of dogs 129 offset to grasp a log 136 from a single vertical plane as in the system 100, the log charger 133 is designed to alternately position a log for pickup at two different parallel vertical planes 146, 147 corresponding to the vertical planes of movement of alternative dogs 129' without the necessity of providing an offset for the dogs as before. In this embodiment, the dogs 129' would continue to be moveable between their retracted and extended transport positions to prevent interference during their reciprocal adjacent side by side movement as one set of dogs 129' carries the log through the breakdown elements and the other set of dogs 129' returns. Roundway bearings 112, again trapping the shafting 109', would continue to provide appropriate load transfer for the loading on the carriages 103', 104' caused by the transportation of the logs. The log processing elements, however, and in particular, the chipper heads 150 would also reciprocate side-to-side in association with the log charger 133 as depicted in FIG. 5 so that it would be in the correct position to receive a log being transported by each carriage pair. FIG. 5 further depicts the pressure rolls 151, a band mill system 152 and the outfeed table 153. The breakdown and log processing elements 140 receive the logs 136 transported by each carriage pair 103, 104 as the log is moved from a first or infeed location disposed to the left of FIG. 5, to a second or outfeed location adjacent the outfeed table 153.

A further, embodiment of the invention again contemplates two offset vertical planes of movement by the carriages and their attached dogs without offsetting the dogs 129. In this embodiment, it is contemplated that the log processing elements 140 would move between the two planes as depicted in FIG. 5 so as to alternately receive logs from the first and second carriage pair 103, 104 during their reciprocal movement. In this embodiment, a single log charger 133 or a dual log charging system could be used to provide logs to the carriages 103, 104.

Yet a further embodiment contemplates a combination log and squared log ("cant") processor system whereby the teachings of the invention are applied to cants provided to the dogs from one side of the log charger and unprocessed logs are provided from the opposite side of the log charger. In this embodiment, cant yokes on the cant side of the log charger would position the cants for pickup but the dogs 129 would grasp and transport the logs and cants in a method identical to that taught by either the offset dog method or the reciprocating dual center line log charger method described above.

The precise position of the roundway bearings 112 about the horizontally spaced shafting 109.1 and 109.2 can be determined according to the loading on the carriages 103, 104. Bearings should be positioned both above and below the horizontal plane 148 (FIG. 2A)

Figure 6:
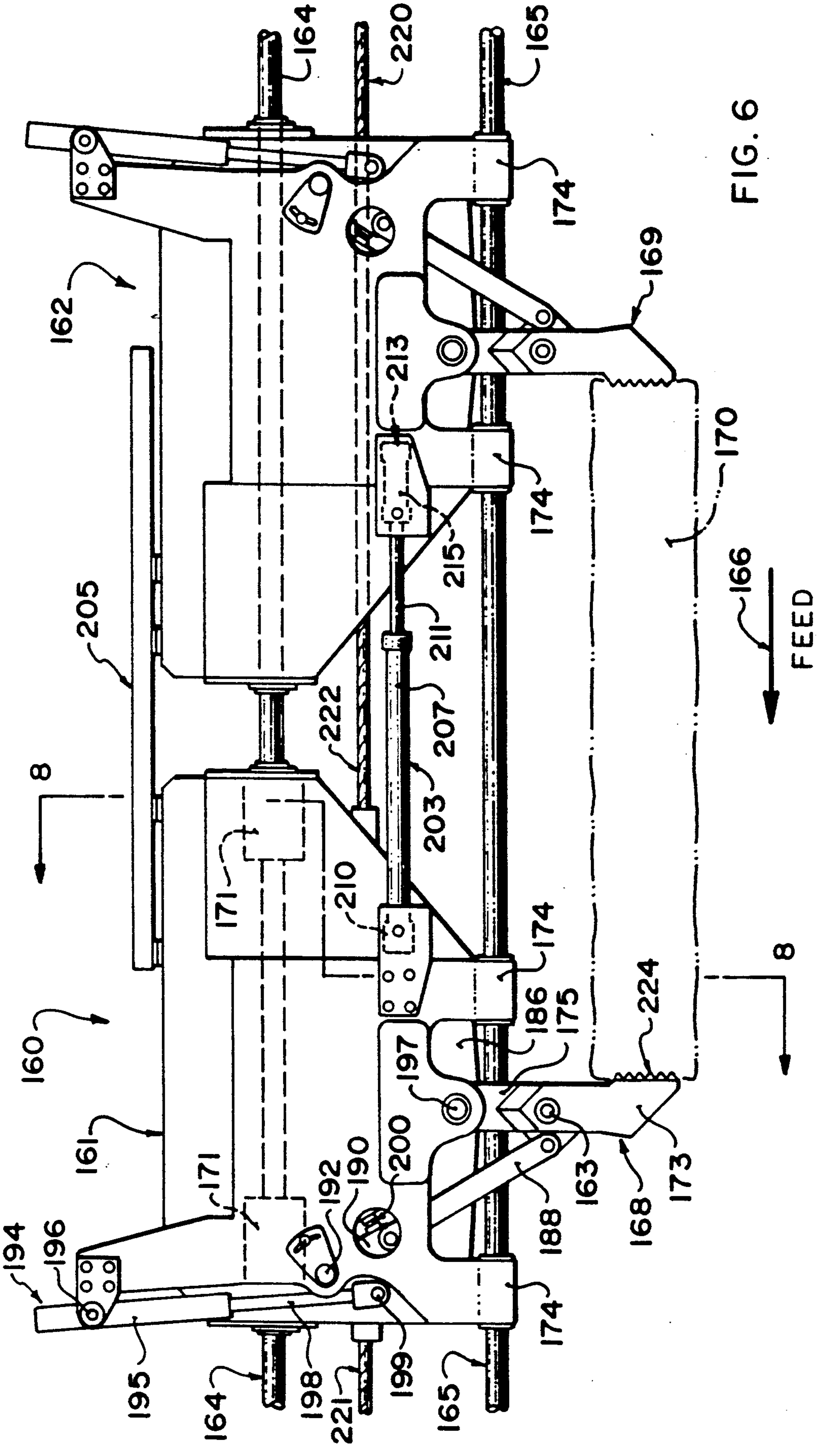
FIG. 6 is a simplified fragmented side elevation of an alternative pair of carriages mounted on an alternative pair of rails showing one means of adjusting spacing between the carriages of the pair.
Figure 7:
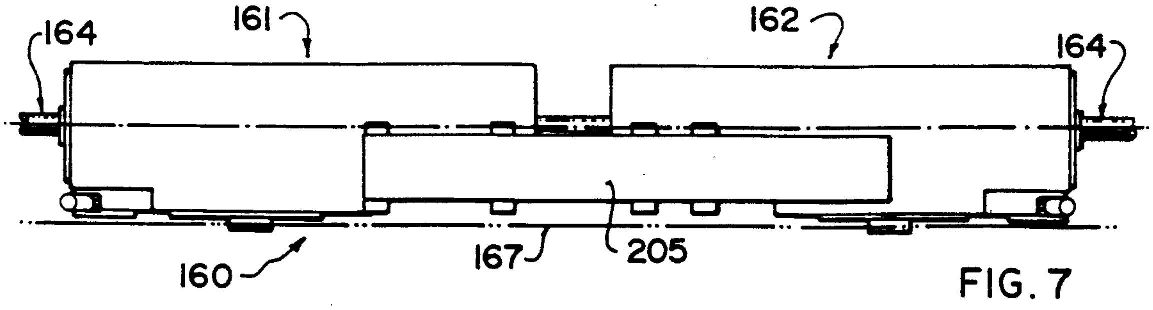
FIG. 7 is a simplified fragmented top plan view of the carriage pair of FIG. 6.
Figure 8:
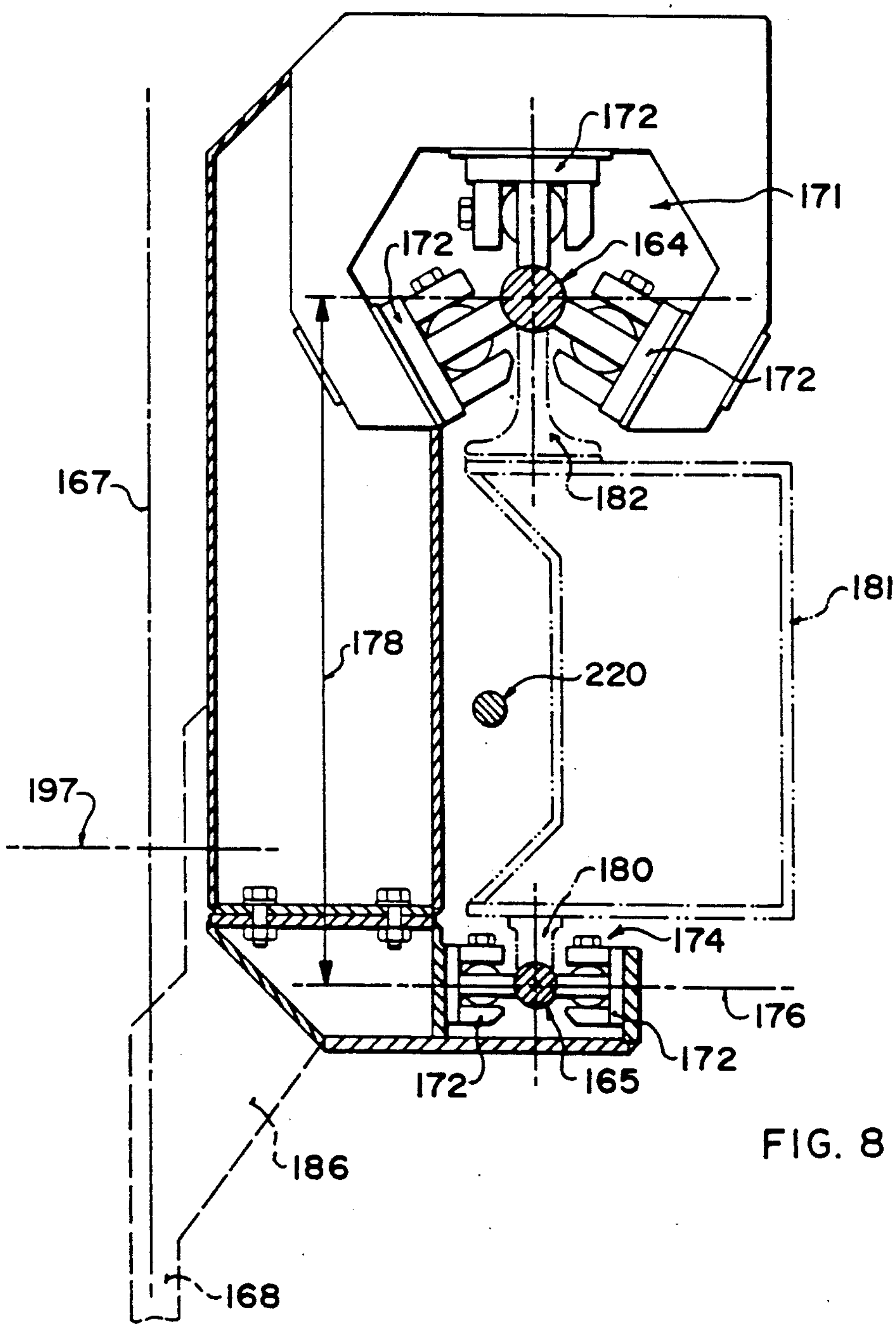
FIG. 8 is a simplified fragmented section on Line 8—8 of FIG. 6, details of a dog means being shown diagrammatically and partially in broken outline.
Figure 9:
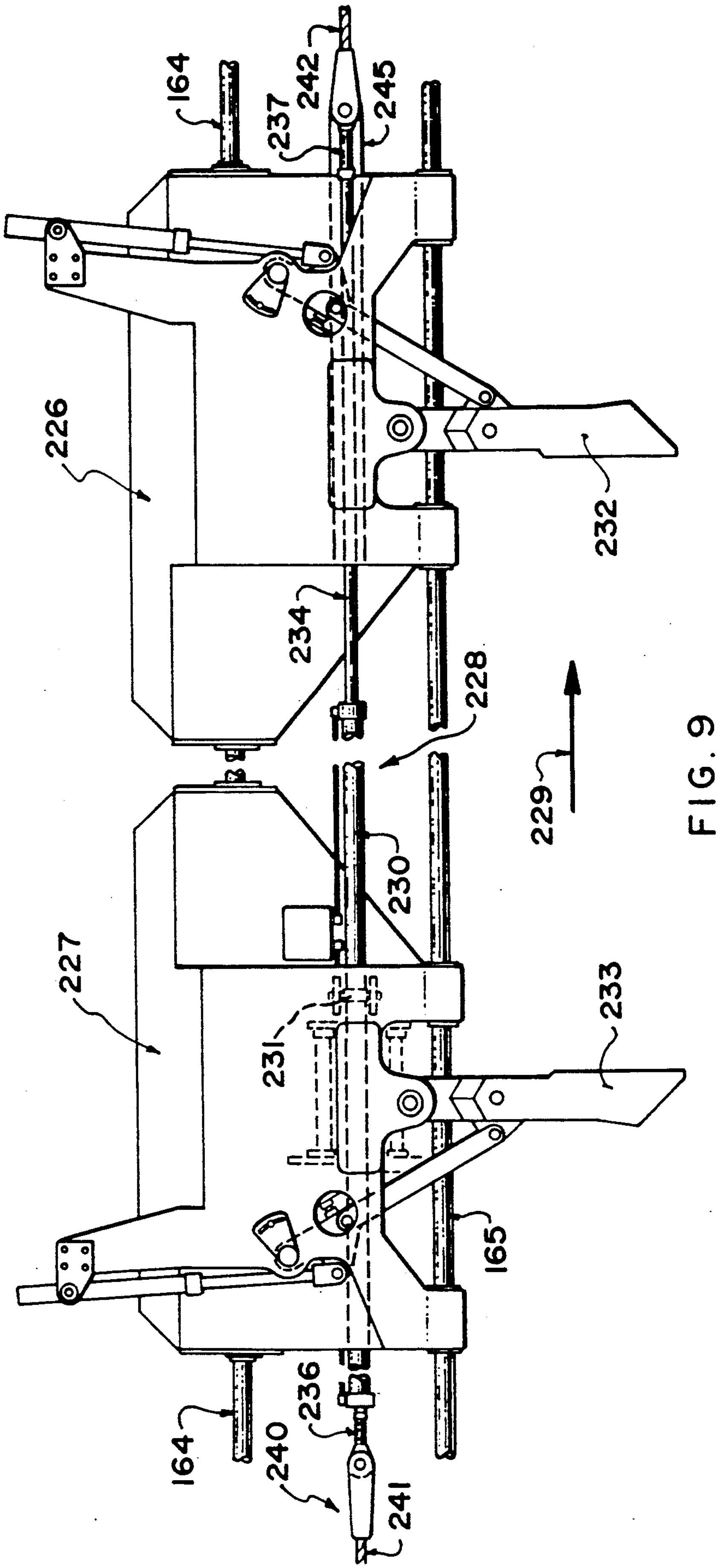
FIG. 9 is a simplified fragmented side elevation of an alternative means of adjusting spacing between the carriages of the carriage pair of FIG. 6.

FIGS. 6 through 8

An alternative rail and carriage system 160 has first and second carriages 161 and 162 of a carriage pair mounted for longitudinal movement along upper and lower rails 164 and 165 respectively. The major difference between this alternative, and the previously described structures relate to the relative dispositions of the rails 164 and 165. In this alternative, the upper rail 164 is disposed vertically above the lower rail 165, so that both rails are disposed relatively closely adjacent to a vertical plane 167 containing the feed axis of the logs.

A log 170, shown in broken outline, is gripped between first and second dogs 168 and 169 which extend downwardly from the carriages 161 and 162 respectively, and is fed in a feed direction shown as arrow 166. Preferably the dog 168 has an outer portion 173 connected to an inner portion 175 by a shear pin 163, which is designed to fracture if an excessive load is applied to the outer portion of the dog. This is to protect the dog, carriage and rail means from damage should interference between the outer portion of the dog and other structure occur. The first and second carriages 161 and 162 are generally functionally similar and are essentially mirror images of each other about transverse plane disposed between the carriages, and thus only the first carriage will be described in detail.

The first carriage has two longitudinally spaced apart upper or first bearing housings 171 which, as seen in FIG. 8, include three roundway bearings 172 disposed equally circumferentially around the upper rail 164, thus providing support for the carriage against radially inclined forces imposed in essentially any direction on the carriage. This bearing is equivalent to the inner bearing housing 111 of the previously described embodiment 100, but this bearing also fully supports the weight of the carriage, while also resisting many of the forces imposed on the carriage by gripping the log, and feeding the log through the log processing or breakdown apparatus, not shown.

The carriage 161 also includes two longitudinally spaced apart lower or second bearing housings 174 which engage the lower rail 165 and cooperate with the two bearing housings 171 to permit a controlled accurate movement of the carriage along the rails. The bearing housing 174 has a pair of spaced roundway bearings 172 which are disposed diametrically oppositely to each other, and within a horizontal plane 176. While the bearing housing 174 functions generally equivalently to the outer bearing housing 110 (FIG. 2B) of the previous embodiment 100, the roundway bearings are disposed differently, and are adapted to resist forces only within the horizontal plane 176. This contrasts with the bearing housing 110 (FIG. 2B) which has angularly disposed roundway bearings which can resist forces having components in two planes. The arrangement of bearing housings in the carriage 161 provides adequate restraint while increasing manufacturing tolerances for spacing 178 between the rails 164, 165. This is because the lower bearing housing 174 provides a greater degree of vertical movement of the bearing housing 174 relative to the rail 165, when compared to equivalent horizontal movement of the bearing housing 110 relative to the rail 109.2 of the previous embodiment.

Furthermore, by locating the second rail 165 below the upper rail 164, an overall narrower apparatus is attained, and the carriage is better able to withstand generally horizontal twisting forces imposed thereon by reaction to axial force applied to the end faces of the logs by the clamping apparatus and by cutting forces. While the upper or first bearing housings 171 withstand much of these forces, the lower bearing housings 174 are necessary, and functions generally equivalently to the outer bearing housing engaging the rail 109.2 (FIG. 2B) with additional advantages as described.

As seen in FIG. 8, the upper and lower rails are supported on T-section members 182 and 180 respectively shown in broken outline, which extend from a support frame 181, shown partially in broken outline.

In FIG. 6, similarly to the previous embodiment the upper portion 175 of the dog is pivotally connected to a husk 186 which provides the offset similar to the husks 105 of the previous embodiment. A dog actuating linkage 188 extends upwardly from the dog to a hinged bellcrank 190 which is hinged to the carriage at a bellcrank hinge 192. The carriage also has a dog actuating cylinder assembly 194 which has a cylinder body 195 which has trunnion mounts 196 for swinging relative to the carriage. The cylinder 194 has a piston rod 198 connected to the bellcrank 190 at a rod hinge 199, so as to rotate the bellcrank about the bellcrank hinge 192 to rotate the dog 168 about a husk pivot 197 to extend or retract the dog 168. Over-centering adjusting means 200 are provided to ensure that, when the dog 168 is fully extended, the link 188 is over-centered with respect to the bellcrank so as to relieve the cylinder 194 from load imposed on the dog 168. Over-centering of the dog to relieve the cylinder 194 of load is known in the trade and requires no further discussion.

The carriages 161 and 162 are interconnected by an elongated hydraulic clamping cylinder assembly 203, and by an elongated cable tray 205 which receives power conduits etc., not shown and is disposed parallel to the clamping cylinder assembly 203. The cylinder assembly 203 is a precision setting cylinder of about 1 meter stroke for a so-called "stud system" for short logs, and has a cylinder body 207 connected to the first carriage 161 by trunnion mounts at 210. The cylinder assembly 203 has a piston rod 211 having an outer end carrying a floating cylinder assembly 213 mounted thereon. The floating cylinder assembly has a stroke of approximately 15 cm and is independently extensible relative to the piston rod, and is itself connected to the carriage 162. The floating cylinder assembly has a respective piston rod and piston, not shown, which are reciprocal within a floating cylinder body 215, broken outline, which is trunnion mounted directly on to the carriage 162. The piston rods of the cylinder assemblies 203 and 213 are axially aligned and interconnected thus providing an essentially single piston rod for both cylinders. A valve, not shown, controls an independent fluid flow to cylinder spaces on opposite sides of the floating cylinder piston. The valve can be put in a "float mode", which permits relatively small adjustments of the space between the cylinder assemblies, or can be closed, thus locking the floating cylinder.

A drive cable system 218 has a length of cable 220 passing around pulleys, not shown, which are equivalent to the pulleys 118 and 123 of the previous embodiment 100, and having opposite ends 221 and 222 connected to the first carriage 161 as shown. The first dog 168 has a rearward facing spiked engaging face 224, which when the dog is in an extended position, engages the transverse end free of the log. The carriage 161 is a "master", and the carriage 162, connected thereto by the cylinder assembly 203 is a "slave".

Operation of the alternative system 160 is generally similar to that as previously described, with additional advantages arising from use of the floating cylinder assembly as follows. The length of the log is determined by the scanning system, not shown, and the clamping cylinder assembly 203, operating on relatively high pressure, is adjusted preferably to a length slightly less than the estimated length, termed "short-clamping". The floating cylinder assembly 213 is set to a float mode, and has sufficient stroke to accommodate the difference between the spacing set between the dogs, and the actual length of the log. The dogs 168 and 169 extend from respective carriages 161 and 162 to over-centered positions and engage respective end faces of the log, the slight difference in spacing between the dogs and length of the log causing the carriage 162 to move slightly away from the carriage 161, such movement being permitted by the floating cylinder assembly 213. The floating cylinder is then pressurized at an adjustable relatively low pressure, and the clamp cylinder is also retracted under a known, relatively high pressure. This applies an accurately known clamping force to end faces of the logs through the relatively low pressure of the float cylinder. Prior to feeding the logs, the float cylinder is then locked by closing the valve, which traps the fluid in the float cylinder which then becomes essentially rigid and non-resilient, ensuring accurate location of the log. This clamping force can be adjusted to accommodate differences in aspect ratios and size of the logs, e.g. a long thin log would tend to be clamped at a less force than a short fat log.

The axial spacing adjustment above provided by the floating cylinder assembly permits rapid engagement of the end faces of the log at an approximate carriage spacing, followed by retraction of the clamping cylinder to attain a desired axial end force on the log itself.

This is considered to be faster than other endogging methods known to the inventor and decreases the wasted time normally required to enable spacing between the dogs to adjust to the length of the log, prior to gripping the log with the required force for feeding through the apparatus. Accurately controlled clamping pressure in the floating cylinder assembly 213 ensures an adequate gripping force appropriate for a particular log.

The use of the floating cylinder above is particularly suitable for the so-called "stud" systems wherein the logs are a nominal 8 feet long (i.e. about 2.5 meters) and there is minimal variation in length thereof. If the logs fed to the machine vary considerably in length, an alternative "random length" system is appropriate, see FIG. 9.

FIG. 9

An alternative means of adjusting spacing between first and second carriages 226 and 227 will now be described, and is appropriate for a random length system in which length of logs could vary from approximately 2.5 meters to 8 meters. A log is gripped between dogs 232 and 233 and is fed in direction of arrow 229. An alternative clamping cylinder assembly 228 has a cylinder body 230 connected by trunnion means 231 to the second carriage 227. The cylinder assembly has a piston rod 234 having a generally centrally mounted piston, not shown, within the cylinder body to provide two chambers. The rod 234 has opposite end portions 236 and 237 extending outwardly from opposite ends of the cylinder body and adjacent the carriages 227 and 226 respectively. An alternative drive cable 240 has one end 241 connected to the end portion 236 of the piston rod, and an opposite end 242 connected to the end portion 237 of the piston rod. The rod end portion 237 and the cable end 242 are connected through a bracket means 245 to the first carriage 226. In this way, the piston rod 234 connects opposite ends of the cable 240 to form a continuous loop, a portion of which is the piston rod extending between the carriages and connected to the first carriage. As fluid is transferred between opposite chambers of the clamping cylinder assembly 228, the second carriage 227 moves along the piston rod 234, thus varying spacing between the first and second carriages. Clamping force applied by the clamping cylinder assembly is accurately controlled by pressure in the cylinder assembly, and accurate length feedback means (not shown) are used to control spacing between the dogs of each carriage, based on scanned length of the log to be gripped.

Operation of the random length system is generally similar to that as previously described, but if the floating cylinder assembly is not used, the alternative accurate length feedback system is required to ensure that the dogs are set at an appropriate spacing prior to engaging end faces of the log. The random length system is disclosed without use of a floating cylinder, which requires that the slave husk or carriage must be positioned considerably longer than the log length. In order to grasp the log, the clamping cylinder is retracted, but this is relatively time consuming as operating pressure of the accurate setting clamping cylinder is considerably higher than clamping pressure as used in the floating cylinder assembly. While a floating cylinder can be eliminated as illustrated, preferably a floating cylinder similar to that shown in FIG. 6 is used with the random length system as this permits easy attainment of accurate clamp pressure, and reduces time required to adjust spacing between the dogs.

It can be seen that, in both the "stud" system and in the "random length" system, tensile forces imposed on the piston rod of the hydraulic clamping cylinder when clamping the logs are increased when feeding the logs through the log break down and processing elements, not shown, thus eliminating any possible compressive forces being applied to the piston rods.

In summary, it can be seen that one method of the invention is for transporting logs along a feed axis from a first to a second location, and includes mounting first and second carriage means for reciprocal movement along first and second carriage support axes respectively. The carriage support axes are spaced laterally apart from, and on opposite sides of, the log feed axis. The method includes engaging transversely disposed end faces at opposite ends of a first log with dog means of the first carriage means in said first location, and applying an axial force thereto to grasp the log, and moving said log by said dog means to said second location. The method includes concurrently resisting twisting forces generated on the carriage means as a reaction to the axial force applied to the log and the lateral spacing between the log feed axis and the first carriage support axis. The method includes concurrently moving the second carriage means with respective dog means thereof retracted from said second location to said first location. The first log is released at the second location and the dogs of the first carriage means are retracted. The dogs of the second carriage means are extended and engage transversely disposed end faces at opposite ends of a second log at the first location and apply an axial force thereto to grasp the second log. The second log is moved by the dog means towards the second location, while concurrently resisting twisting forces generated on the second carriage means as before. Concurrently the first carriage means moves towards the first location and the method is repeated. It can be seen that the roundway bearing housings of the carriage means and the spaced rails of any of the embodiments function similarly, and serve as means to resist twisting forces and to maintain the carriage means in contact with the rails, whether the second rail is spaced laterally horizontally outwardly from the first rail as in FIG. 1A, or vertically below the first rail as in FIG. 6.

Various other changes in the specific embodiments described are contemplated by the teachings herein and the description given should be taken as illustrative only and not as limiting the scope of the invention which should be construed in accordance with the accompanying claims.

I claim:

1. An endogging system comprising:

(a) first and second carriage means mounted for reciprocal movement along first and second carriage support axes respectively spaced laterally apart from, and on opposite sides of, a vertical plane containing a log feed axis, each of said carriage means being operable to transport a log along the log feed axis from a first location to a second location within said vertical plane, and to return to said first location without said log, (b) each of said carriage means having two interconnected carriages, each of said carriages including dog means extending downwardly therefrom to said vertical plane and being adapted to apply an axial force to engage transversely disposed end faces of said log substantially on said vertical plane, (c) each of said dog means having a transition area between said dog means and said respective carriage, said transition area being off-set from said vertical plane whereby said first carriage means may pass said second carriage means when said dog means of said first carriage means are extended in a log transport mode and said dog means of said second carriage means are in a retracted mode, said dog means being substantially on said vertical plane in both said transport and said retracted mode, (d) a pair of first and second rails located on each side of the log feed axis to provide a respective rail means for mounting the two carriages of each carriage means for reciprocal movement therealong, (e) each carriage means having means for resisting twisting forces on the carriage mean generated as a reaction to said axial force applied by said dog means, said means for resisting said twisting forces comprises the first and second rails being spaced apart at a spacing sufficient to resist the twisting forces imposed thereon by the carriage means as a reaction to axial forces applied by said dog means, and in which each carriage means has bearing means cooperating with the respective rail means for resisting said forces, at least one of said bearing means of each carriage cooperating with the respective rail so as to resist both horizontal and vertical components of said forces.

2. An endogging system as in claim 1 wherein:

said first and second rails are laterally spaced apart for mounting the carriages and each of said carriage means reciprocates on said rail means, and said two carriages of each of said carriage means are separated by a distance, the distance between said two separated carriages on said rail means being adjustable to accommodate logs of different lengths.

3. An endogging system as in claim 2 further including:

(a) husks connected to said carriages wherein each of said dog means is connected to a respective husk, (b) linkage means to extend said dog means when grasping a log at said first location and to retract said dogs when releasing said log at said second location.

4. An endogging system as in claim 2 further including:

(a) chain and pulley adjustment means provided on one carriage of each pair, wherein said distance between the carriages of a pair is adjustable by the chain and pulley adjustment means.

5. An endogging system as in claim 2 further including:

(a) a clamping cylinder assembly extending between the carriages, wherein said distance is adjustable by the clamping cylinder assembly.

6. An endogging system as claimed in claim 1 wherein:

(a) the first and second rails being spaced apart horizontally, with the first rail being located generally adjacent the plane containing the feed axis, (c) the first bearing housing having three circumferentially spaced apart bearing assemblies cooperating with the first rail, and the second bearing housing having two circumferentially spaced apart bearing assemblies cooperating with the second rail.

7. An endogging system as claimed in claim 1 wherein:

(a) the first rail is spaced vertically above the second rail on the same side of the plane containing the feed axis of the log, (b) the first bearing housing has three circumferentially spaced apart bearing assemblies cooperating with the first rail, and the second bearing housing has two circumferentially spaced apart bearing assemblies cooperating with the second rail.

8. An endogging system as claimed in claim 7 in which:

(a) the first bearing housing essentially encloses the first rail means to essentially prevent radial movement of the carriage means relative to the first rail means, (b) the second bearing housing engages opposite sides of the second rail in such a way as to permit relative radial movement between the second rail means and the carriage means to accommodate variations in spacing between the rail means.

9. An endogging system as claimed in claim 5 further including:

(a) a cable extending between a pair of spaced pulleys located adjacent the first and second locations, the cable having opposite ends secured to a first carriage of each carriage pair to form a loop containing the first carriage, and in which the clamping cylinder assembly includes:

(b) an extensible and retractable hydraulic log clamping cylinder extending between the first carriage and a second carriage of the carriage pair, so that extension or retraction of the cylinder changes spacing between the carriages of a pair to accommodate logs of different lengths.

10. An endogging system as claimed in claim 9 further including:

(a) a floating cylinder assembly cooperating with the hydraulic clamping cylinder, the floating cylinder assembly having means to permit the floating cylinder assembly to attain a float mode to permit the movement of one carriage relative to the remaining carriage independently of movement of the clamping cylinder assembly to facilitate fine adjustment of spacing and clamping pressure between the dogs.

11. An endogging apparatus as claimed in claim 10 in which:

(a) the clamping cylinder assembly has a clamping cylinder body and a piston rod carrying a piston within the clamping cylinder body, the clamping cylinder body being connected to the first carriage or the pair, (b) the floating cylinder assembly has a floating cylinder body and a piston rod carrying a piston within the floating cylinder body, the floating cylinder body being connected to the second carriage of the pair, the piston rod of the clamping cylinder and float cylinder assemblies being coaxially aligned with, and connected to, each other.

12. An endogging system of claim 1 further comprising log processing means provided between the first and second locations to receive the log carried by the carriage as it passes from the first to the second location.

13. An endogging system comprising:

(a) a pair of rail means, each of said rail means being located on opposite sides of a vertical plane containing a log feed axis and having spaced apart first and second rails.

(b) a pair of carriages mounted on each of said rail means and being operable to transport logs along the log feed axis, each pair of said carriages being interconnected and longitudinally separated on said rail means, (c) husk and dog means connected to each of said carriages, said dog means having a transition area which is off-set between said vertical plane and said respective husk means, said dog means being retractable and extendible by linkages between said husk and said dog means so that, when extended, the dog means of the respective pair of carriages can apply an axial force to engage transversely disposed end faces of a log held by the carriage, (d) each of said pair of carriages having bearing means for resisting twisting forces on the carriage generated as a reaction to said axial force applied by said dog means, the bearing means of each pair of carriages cooperating with the first and second rails of the respective rail means so that said spacing between the first and second rails is sufficient to resist twisting forces imposed thereon by the carriage means as a reaction to said axial force applied by said dog means, at least one of said bearing means of each carriage cooperating with the respective rail so as to resist both horizontal and vertical components of said forces, (e) each of said pair of carriages being operable to reciprocate on its respective rail means and to pass the other of said pair of carriages when said dog means on one of said pair of carriages is retracted and said dog means on the other of said pair of carriages is extended.

14. A method of transporting logs along a feed axis from a first location through an intermediate process station to a second location on the feed axis, the method comprising the steps of:

(a) mounting first and second carriage means for reciprocal movement along first and second carriage support axes respectively, the carriage support axes being spaced laterally apart from, and on opposite sides of, the log feed axis, (b) engaging transversely disposed end faces at opposite ends of a first log with dog means of the first carriage means in said first location and applying an axial force thereto to grasp the log, and moving said log by said dog means to said second location while concurrently resisting both horizontal and vertical components of twisting forces generated on the first carriage means as a reaction to said axial force applied to the log by means of the lateral spacing between the log feed axis and the first carriage support axis, (c) concurrently moving the second carriage means with the respective dog means thereof retracted from said second location to said first location, (d) releasing said first log at said second location and then retracting the dogs of the first carriage means, (e) extending the dogs of the second carriage means and engaging transversely disposed end faces at opposite ends of a second log with said dog.

15. A method as claimed in claim 14 further including:

(a) providing a pair of carriages for each carriage means and interconnecting the said pair of carriages with a hydraulic clamping cylinder, (b) extending or retracting the hydraulic clamping cylinder to vary spacing between the dogs of each carriage to accommodate logs of different lengths.

16. A method as claimed in claim 15 further including:

(a) permitting one carriage of the pair to move independently of the hydraulic clamping cylinder interconnecting the other carriage, to facilitate fine adjustment of spacing between the dogs to attain a desired clamping force.

17. A method as claimed in claimed 16 further including:

(a) setting the hydraulic clamping cylinder to position the carriages and dogs at a first spacing slightly less than length of the log to be gripped by the dogs, (b) extending the dogs to over-centred positions and engaging end faces of the log therewith, causing the carriages to move apart slightly to a second spacing independently of the clamping cylinder, (c) locking the carriages at the second spacing and applying a pre-determined axial gripping force to end faces of the logs.

18. A method as claimed in claim 14 further comprising:

(a) providing a log processing station between said first and second locations to receive said logs from said first and second carriage means respectively.

19. A method of claim 14 further comprising offsetting log grasping portions of said dog means such that said vertical plane generally passes through said log grasping portions of said dog means when said log is grasped.

* * * * *